(12) United States Patent
Inoue et al.

(10) Patent No.: US 8,407,051 B2
(45) Date of Patent: Mar. 26, 2013

(54) SPEECH RECOGNIZING APPARATUS

(75) Inventors: Yuzuru Inoue, Tokyo (JP); Tadashi Suzuki, Tokyo (JP); Fumitaka Sato, Tokyo (JP); Takayoshi Chikuri, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 698 days.

(21) Appl. No.: 12/599,217

(22) PCT Filed: Mar. 27, 2008

(86) PCT No.: PCT/JP2008/000772
§ 371 (c)(1),
(2), (4) Date: Nov. 6, 2009

(87) PCT Pub. No.: WO2009/004750
PCT Pub. Date: Jan. 8, 2009

(65) Prior Publication Data
US 2011/0208525 A1 Aug. 25, 2011

(30) Foreign Application Priority Data
Jul. 2, 2007 (JP) .................................. 2007-174386

(51) Int. Cl.
*G10L 15/12* (2006.01)
(52) U.S. Cl. ...................................................... 704/241
(58) Field of Classification Search ........... 704/231–257
See application file for complete search history.

(56) References Cited

U.S. PATENT DOCUMENTS

| | | | |
|---|---|---|---|
| 5,918,222 A * | 6/1999 | Fukui et al. ................... | 704/251 |
| 6,629,072 B1 | 9/2003 | Thelen et al. | |
| 2003/0023432 A1 | 1/2003 | Kyomitsu | |
| 2004/0176953 A1 | 9/2004 | Coyle et al. | |
| 2005/0036589 A1* | 2/2005 | Bossemeyer ................ | 379/88.01 |
| 2005/0075877 A1* | 4/2005 | Minamino et al. ............ | 704/254 |
| 2006/0115070 A1 | 6/2006 | Bushey et al. | |
| 2008/0201135 A1* | 8/2008 | Yano ............................ | 704/201 |
| 2009/0222265 A1 | 9/2009 | Iwamiya et al. | |

FOREIGN PATENT DOCUMENTS

| | | |
|---|---|---|
| DE | 19956747 C1 | 1/2001 |
| EP | 1 591 979 A1 | 11/2005 |
| JP | 5-18118 B2 | 3/1993 |
| JP | 2002-149191 A | 5/2002 |

(Continued)

*Primary Examiner* — Abul Azad
(74) *Attorney, Agent, or Firm* — Birch, Stewart, Kolasch & Birch, LLP

(57) ABSTRACT

A speech recognizing apparatus includes a speech start instructing section 3 for instructing to start speech recognition; a speech input section 1 for receiving uttered speech and converting to a speech signal; a speech recognizing section 2 for recognizing the speech on the basis of the speech signal; an utterance start time detecting section 4 for detecting duration from the time when the speech start instructing section instructs to the time when the speech input section delivers the speech signal; an utterance timing deciding section 5 for deciding utterance timing indicating whether the utterance start is quick or slow by comparing the duration detected by the utterance start time detecting section with a prescribed threshold; an interaction control section 6 for determining a content, which is to be shown when exhibiting a recognition result of the speech recognizing section, in accordance with the utterance timing decided; a system response generating section 7 for generating a system response on the basis of the determined content to be shown; and an output section 8 and 9 for outputting the system response generated.

8 Claims, 16 Drawing Sheets

FOREIGN PATENT DOCUMENTS

| | | |
|---|---|---|
| JP | 2003-29778 A | 1/2003 |
| JP | 2004-333543 A | 11/2004 |
| JP | 2006-313261 A | 11/2006 |
| JP | 2007-4054 A | 1/2007 |
| WO | 2007/069377 A1 | 6/2007 |

* cited by examiner

SPEECH RECOGNIZING APPARATUS

TECHNICAL FIELD

The present invention relates to a speech recognizing apparatus mounted on a vehicle for recognizing speech a user utters.

BACKGROUND ART

Conventionally, a speech interactive system has been known which carries out conversation between a system and a user with speech (see Patent Document 1, for example). The speech interactive system includes a speaker for outputting system side speech to a user; a microphone for converting speech the user utters in response to the system side speech output from the speaker to a speech signal; a speech recognizing section for recognizing the speech input to the microphone; an utterance timing detecting section for detecting utterance timing on the basis of the speech signal obtained by converting the speech through the microphone and a response speech signal from a response generating section; a skill level deciding section for deciding a skill level of the speech interaction of the user using the utterance timing; and a speech output altering section for altering an output content of the system side speech in accordance with the skill level decided by the skill level deciding section.

Generally, in the speech recognizing apparatus, the speech recognition is decided only by acoustic characteristics of the speech the user utters. For example, the duration from the time the system enters into a recognizable mode when the user pushes down a recognition start button to the time the user actually starts his or her utterance (referred to as "utterance timing" from now on) does not affect the recognition result.

Patent Document 1: Japanese Patent Laid-Open No. 2004-333543.

The speech interactive system disclosed in the foregoing Patent Document 1 is configured in such a manner as to decide the skill level of the speech interaction on the basis of the utterance timing, frequency of use and utterance speed, and to carry out the speech recognition considering the skill level. However, the skill level is applied only to the output alteration of the system side speech (guidance speech), and does not have a direct effect on the recognition result. Accordingly, there is a problem of bringing about misidentification depending on the utterance timing of the user.

The present invention is implemented to solve the foregoing problem. Therefore it is an object of the present invention to provide a speech recognizing apparatus mounted on a vehicle capable of providing a user with appropriate information about the speech recognition result in accordance with the user utterance timing.

DISCLOSURE OF THE INVENTION

To solve the foregoing problem, a speech recognizing apparatus in accordance with the present invention includes: a speech start instructing section for instructing to start speech recognition; a speech input section for receiving uttered speech and for converting it to a speech signal; a speech recognizing section for recognizing the speech on the basis of the speech signal delivered from the speech input section; an utterance start time detecting section for detecting duration from the time when the speech start instructing section instructs to start the speech recognition to the time when the speech input section delivers the speech signal; an utterance timing deciding section for deciding utterance timing indicating whether an utterance start is quick or slow by comparing the duration detected by the utterance start time detecting section with a prescribed threshold; a speech recognition score correcting section for correcting a speech recognition score of words recognized by the speech recognizing section in accordance with the utterance timing decided by the utterance timing deciding section; a score cutoff deciding section for deciding whether to provide a recognition result or not in accordance with the speech recognition score corrected by the speech recognition score correcting section; an interaction control section for determining, in accordance with the decision result of the score cutoff deciding section, a content to be shown when exhibiting the recognition result of the speech recognizing section; a system response generating section for generating a system response on the basis of the content to be shown determined by the interaction control section; and an output section for outputting the system response generated by the system response generating section.

According to the speech recognizing apparatus in accordance with the present invention, since it is configured in such a manner as to output the system response with the content corresponding to the utterance timing, it can provide a user with an appropriate telop and response guidance. As a result, the user can carry out a pleasant and appropriate manipulation, and reduce a feeling of displeasure when misidentification is made. In addition, since it can correct the recognition result in accordance with the user utterance timing, it can be configured in such a manner as to prevent the recognition result with a high probability of misidentification from being exhibited to the user. As a result, it can prevent words the user does not intend from being recognizing.

BEST MODE FOR CARRYING OUT THE INVENTION

The best mode for carrying out the invention will now be described with reference to the accompanying drawings to explain the present invention in more detail.

Embodiment 1

Figure 1:
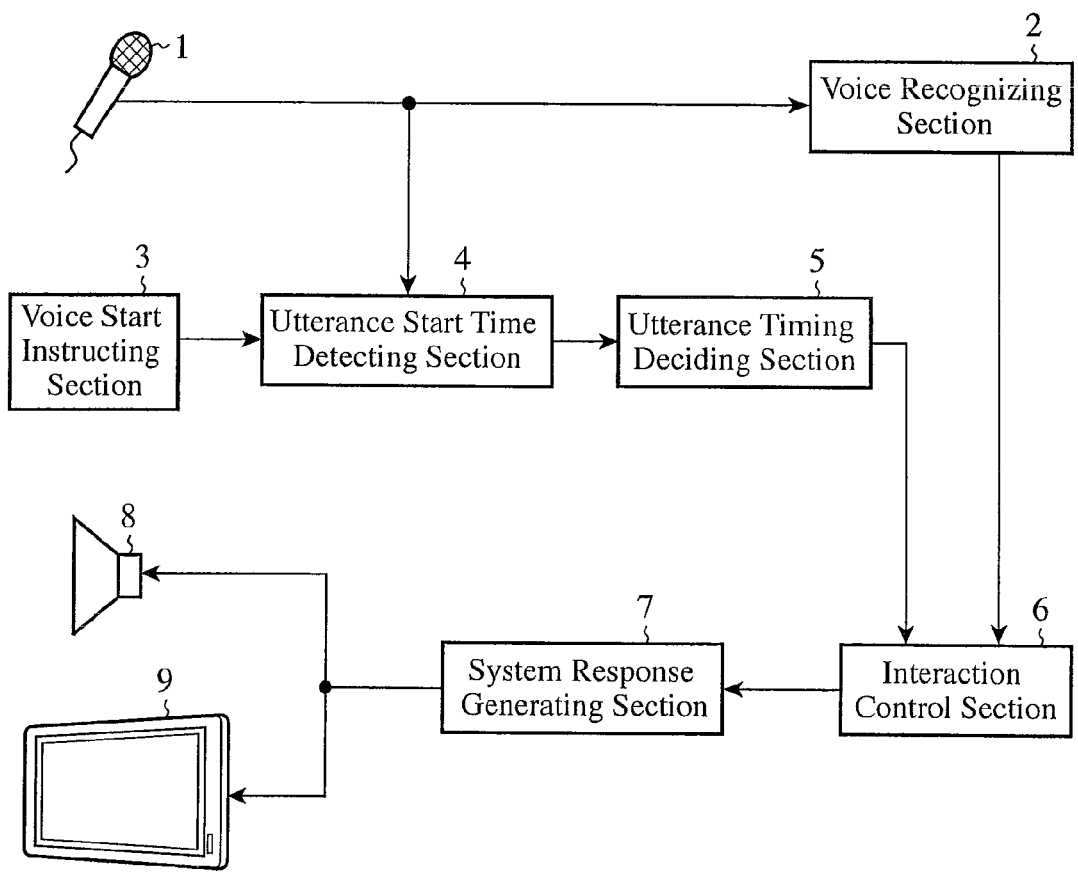
FIG. 1 is a block diagram showing a configuration of a speech recognizing apparatus of an embodiment 1 in accordance with the present invention.

FIG. 1 is a block diagram showing a configuration of a speech recognizing apparatus of an embodiment 1 in accordance with the present invention. The speech recognizing apparatus includes a speech input section 1, a speech recognizing section 2, a speech start instructing section 3, an utterance start time detecting section 4, an utterance timing deciding section 5, an interaction control section 6, a system response generating section 7, a speech output section 8 and a telop output section 9.

The speech input section 1, which consists of a microphone, for example, receives the speech the user utters, converts it to an electric signal, and delivers it to the speech recognizing section 2 and utterance start time detecting section 4 as a speech signal.

The speech recognizing section 2 recognizes the speech the user utters by processing the speech signal delivered from the speech input section 1. More specifically, the speech recognizing section 2 recognizes the speech by successively carrying out: speech section detection for detecting the user utterance from the speech signal delivered from the speech input section 1; sound analysis for converting the speech signal obtained by the speech section detection to a parameter representation; probability operation for selecting and identifying the maximum likelihood phonemic candidates on the basis of the minimum unit of the speech obtained by the sound analysis; and comparison for deciding the recognition result by comparing the phonemes obtained by the probability operation with a dictionary that stores words and the like.

The sound analysis, using the LPC mel cepstrum (Linear Predictor Coefficient) or MFCC (Mel Frequency Cepstrum Coefficient), for example, converts the speech signal delivered from the speech input section 1 to a feature vector series, and estimates the outline (spectral envelope) of the speech spectrum. The probability operation, using the HMM (Hidden Markov Model), for example, carries out phonemic symbolization of the speech signal using sound parameters extracted through the sound analysis based on the input speech, and selects the maximum likelihood phonemic candidates by comparing with a standard phonemic model prepared in advance. The comparison processing compares the phonemic candidates with the dictionary, and selects words of great likelihood. The words recognized by the speech recognizing section 2 are delivered to the interaction control section 6.

The speech start instructing section 3 comprises a recognition start button and the like formed on a screen or provided on a manipulation section (not shown), for example. When the speech start instructing section 3 instructs to start the speech recognition, a speech recognition start signal indicating a start is delivered to the utterance start time detecting section 4. The speech recognizing apparatus enters into the recognizable mode using the speech recognition start signal from the speech start instructing section 3 as a trigger (referred to as "speech start trigger" from now on).

The utterance start time detecting section 4 detects the duration from a transition to the speech recognizable mode, that is, from receiving the speech recognition start signal from the speech start instructing section 3 to the actual start of the user utterance, that is, to the input of the speech signal from the speech input section 1. The duration the utterance start time detecting section 4 detects is delivered to the utterance timing deciding section 5 as the utterance start time.

The utterance timing deciding section 5 decides the utterance timing on the basis of the utterance start time delivered from the utterance start time detecting section 4. More specifically, the utterance timing deciding section 5 makes a decision that the utterance timing is "quick" if the utterance start time delivered from the utterance start time detecting section 4 is equal to or less than a prescribed threshold, and that the utterance timing is "slow" if it is greater than the prescribed threshold. The utterance timing decided by the utterance timing deciding section 5 is delivered to the interaction control section 6.

The interaction control section 6 decides the content to be shown to the user in accordance with the utterance timing delivered from the utterance timing deciding section 5. To be concrete, the interaction control section 6, which decides a system response (telop and response guidance) when showing the words delivered from the speech recognizing section 2 to the user, alters the content of the system response in this case in accordance with the utterance timing (quick/slow) decided by the utterance timing deciding section 5. For example, when the utterance timing is quick, the interaction control section 6 judges that utterer pronounced in haste, and when the utterance timing slow, it judges that the utterer pronounced with hesitation. In either case, since it is likely that wrong words are recognized, it generates a guidance for confirmation such as "Is it all right with ○○ (recognizing words)?". The confirmation guidance generated by the interaction control section 6 is delivered to the system response generating section 7 together with a generating request of a system response.

In response to a request for generating the system response delivered from the interaction control section 6, the system response generating section 7 generates the system response (telop and response guidance) corresponding to the confirmation guidance delivered at the same time. The system response generated by the system response generating section 7 is delivered to the speech output section 8 and telop output section 9.

The speech output section 8, which consists of a speaker, for example, constitutes part of the output section in accordance with the present invention. The speech output section 8 outputs the response guidance, which is contained in the system response delivered from the system response generating section 7, in speech.

The telop output section 9, which consists of a display unit such as a liquid crystal display unit, for example, corresponds to another part of the output section in accordance with the present invention. The telop output section 9 displays the telop contained in the system response delivered from the system response generating section 7.

Figure 2:
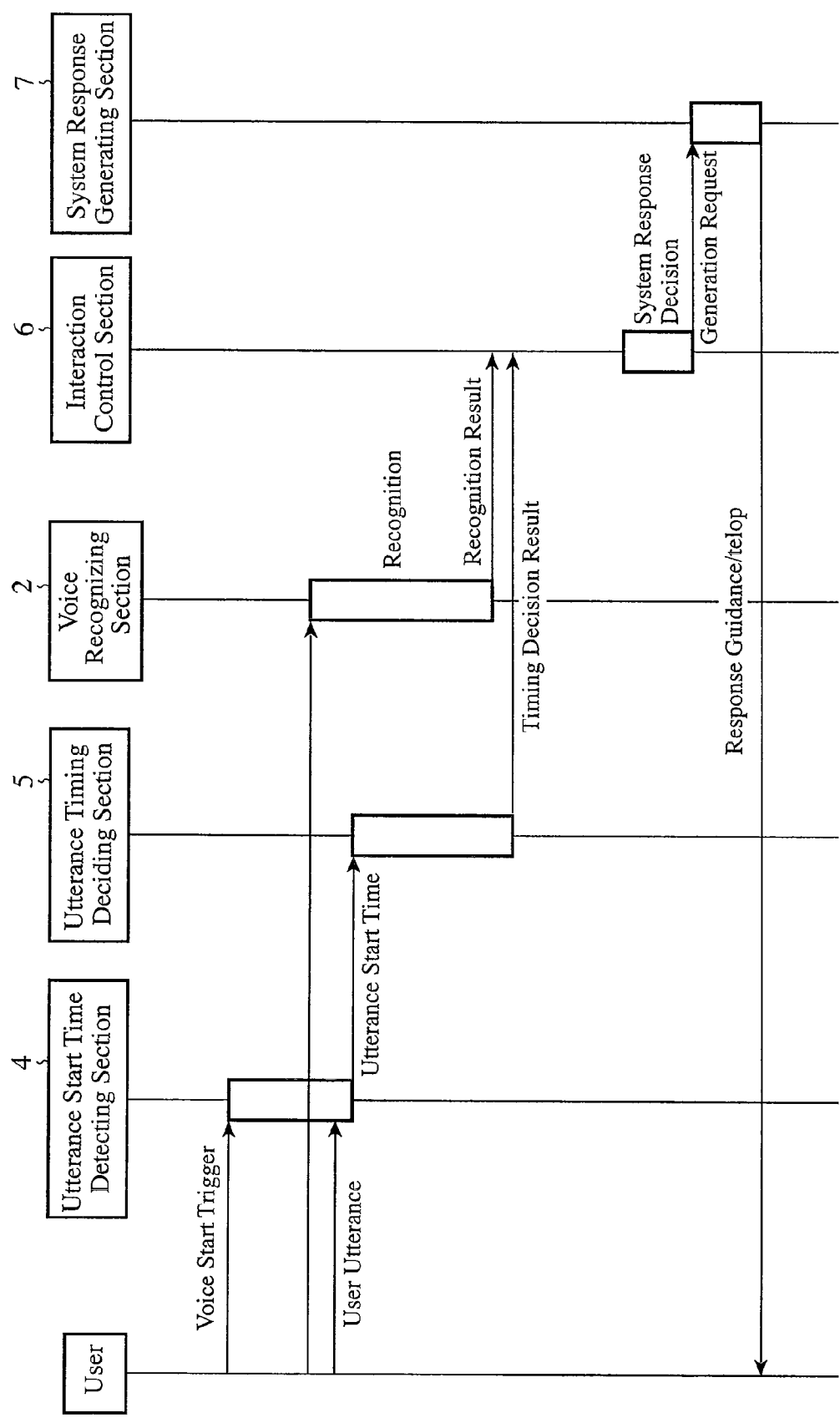
FIG. 2 is a sequence diagram showing the operation of the speech recognizing apparatus of the embodiment 1 in accordance with the present invention.

Next, the operation of the speech recognizing apparatus of the embodiment 1 in accordance with the present invention with the foregoing configuration will be described with reference to a sequence chart shown in FIG. 2.

First, in response to a user manipulation of the speech start instructing section 3, the speech start trigger is delivered to the utterance start time detecting section 4. This causes the utterance start time detecting section 4 to start measurement of time. Subsequently, when the user utters, his or her speech is converted to the electric signal by the speech input section 1, and is delivered to the speech recognizing section 2 and utterance start time detecting section 4 as the speech signal. Receiving the speech signal from the speech input section 1, the utterance start time detecting section 4 stops measurement of the time, detects the duration from the reception of the speech start trigger from the speech start instructing section 3 to the input of the speech signal from the speech input section 1, and delivers it to the utterance timing deciding section 5 as the utterance start time. The utterance timing deciding section 5 decides the utterance timing (quick/slow) on the basis of utterance start time delivered from the utterance start time detecting section 4, and delivers the decision result to the interaction control section 6 as a timing decision result.

On the other hand, the speech recognizing section 2, which receives the speech signal from the speech input section 1, recognizes the speech the user utters on the basis of the speech signal, and delivers words obtained as a result of the recognition to the interaction control section 6. The interaction control section 6 decides the system response (telop and response guidance) at the time of providing the user with the words delivered from the speech recognizing section 2; alters the content of the decided system response in accordance with the utterance timing (quick/slow) delivered from the utterance timing deciding section 5; and delivers to the system response generating section 7 as a confirmation guidance together with the request for generating the system response.

In response to the request for generating the system response delivered from the interaction control section 6, the system response generating section 7 generates the system response (telop and response guidance) corresponding to the confirmation guidance delivered at the same time, and delivers it to the speech output section 8 and telop output section 9. This causes the speech output section 8 to output the response guidance delivered from the system response generating section 7 in speech, and the telop output section 9 to display the telop delivered from the system response generating section 7 to be shown to the user.

As described above, according to the speech recognizing apparatus of the embodiment 1 in accordance with the present invention, it can alter the system response (telop and response guidance) in accordance with the user utterance timing. Accordingly, the speech recognizing apparatus can provide the user with the appropriate telop and response guidance, thereby enabling the user to carry out pleasant and appropriate manipulation, and being able to reduce user's feeling of displeasure when misidentification is made.

Embodiment 2

Figure 3:
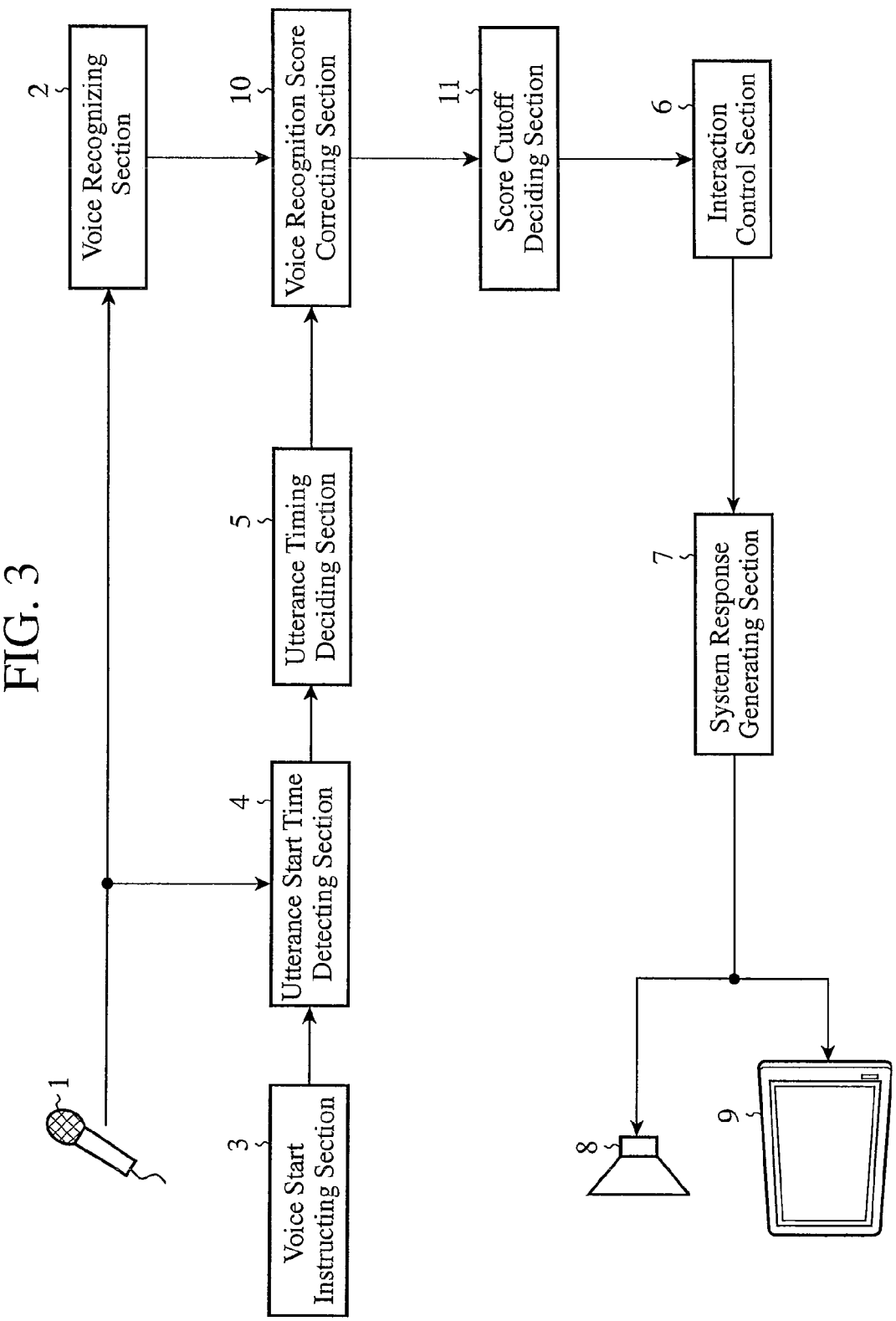
FIG. 3 is a block diagram showing a configuration of a speech recognizing apparatus of an embodiment 2 in accordance with the present invention.

FIG. 3 is a block diagram showing a configuration of a speech recognizing apparatus of an embodiment 2 in accordance with the present invention. The speech recognizing apparatus is constructed by adding to the speech recognizing apparatus of the embodiment 1 a speech recognition score correcting section 10 and a score cutoff deciding section 11. In the following, the same or like portions to the components of the speech recognizing apparatus of the embodiment 1 are designated by the same reference numerals used in the embodiment 1 and their description will be omitted or simplified, and the description will be made centering on portions different from the speech recognizing apparatus of the embodiment 1.

In the speech recognizing apparatus of the embodiment 2, the speech recognizing section 2 delivers the words it recognizes to the speech recognition score correcting section 10 together with the speech recognition score of the words. In addition, the utterance timing deciding section 5 delivers the decided utterance timing to the speech recognition score correcting section 10.

The speech recognition score correcting section 10 corrects the speech recognition score of the words delivered from the speech recognizing section 2 in accordance with the utterance timing delivered from the utterance timing deciding section 5. Here, the speech recognition score is information representing the likelihood of the recognition result. For example, when the utterance timing is quick, it is judged that the utterer pronounced in haste, and when the utterance timing is late, it is judged that the utterer pronounced with hesitation, in either case of which it is likely that the words are recognized erroneously, and hence the speech recognition score correcting section 10 corrects in such a manner as to reduce the speech recognition score. The words with the speech recognition score corrected by the speech recognition score correcting section 10 are delivered to the score cutoff deciding section 11.

The score cutoff deciding section 11 decides whether to provide the user with the recognition result (words) or not in accordance with the speech recognition score of the words delivered from the speech recognition score correcting section 10. To be concrete, the score cutoff deciding section 11 checks whether the speech recognition score of the words delivered from the speech recognition score correcting section 10 is equal to or greater than a prescribed threshold, and delivers, when it is equal to or greater than the prescribed threshold, the words to the interaction control section 6, and does not deliver the words to the interaction control section 6 when it is less than the prescribed threshold.

When the words are delivered from the speech recognizing section 2, the interaction control section 6 determines the system response at the time of showing the words to the user and generates the guidance. The guidance generated by the interaction control section 6 is delivered to the system response generating section 7 together with the request for generating the system response.

Figure 4:
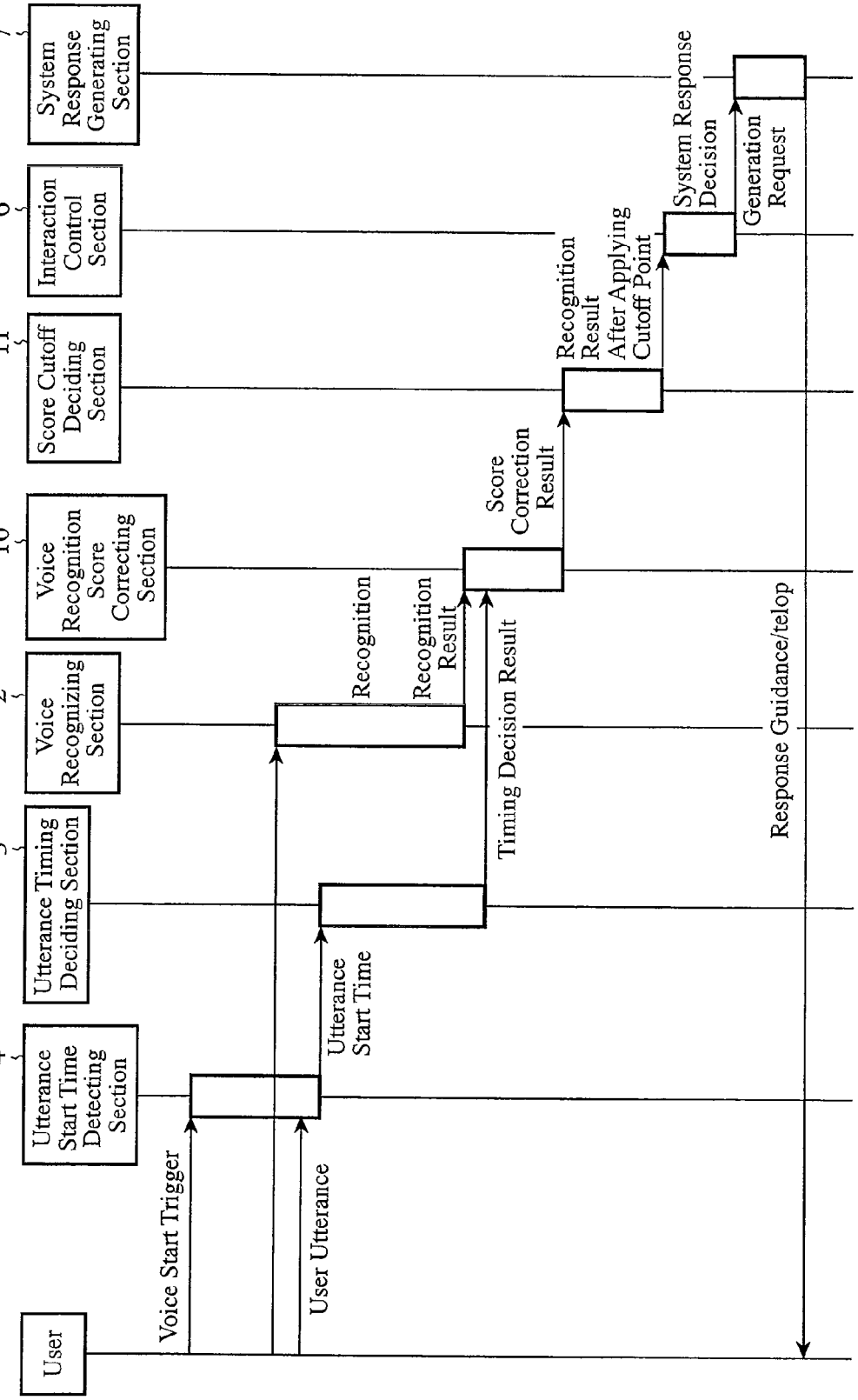
FIG. 4 is a sequence diagram showing the operation of the speech recognizing apparatus of the embodiment 2 in accordance with the present invention.

Next, the operation of the speech recognizing apparatus of the embodiment 2 in accordance with the present invention with the foregoing configuration will be described with reference to a sequence chart shown in FIG. 4.

As for the operation from the time when the speech start trigger is delivered to the utterance start time detecting section 4 in response to a user manipulation of the speech start instructing section 3 to the time when the utterance timing deciding section 5 outputs the utterance timing (quick/slow), and as for the operation up to the time when the speech recognizing section 2, which receives the speech signal from the speech input section 1, outputs the recognition result, they are the same as those of the speech recognizing apparatus of the embodiment 1 described above. The utterance timing output from the utterance timing deciding section 5 is delivered to the speech recognition score correcting section 10, and the recognition result output from the speech recognizing section 2 is delivered to the speech recognition score correcting section 10.

The speech recognition score correcting section 10 corrects the speech recognition score of the words delivered from the speech recognizing section 2 in accordance with the utterance timing delivered from the utterance timing deciding section 5, and delivers the score correction result to the score cutoff deciding section 11. The score cutoff deciding section 11 checks whether the speech recognition score of the words delivered from the speech recognition score correcting section 10 is equal to or greater than the prescribed threshold, and delivers the words to the interaction control section 6 when it is equal to or greater than the prescribed threshold, but does not deliver the words to the interaction control section 6 when it is less than the prescribed threshold.

When the words are delivered from the score cutoff deciding section 11, the interaction control section 6 determines the system response (telop and response guidance) at the time of showing the words to the user, and delivers the content of the determined system response to the system response generating section 7 as the guidance together with the request for generating the system response. In response to the request for generating the system response delivered from the interaction control section 6, the system response generating section 7 generates the system response (telop and response guidance) corresponding to the guidance, and delivers it to the speech output section 8 and telop output section 9. This causes the speech output section 8 to output the response guidance delivered from the system response generating section 7 in speech, and the telop output section 9 to display the telop delivered from the system response generating section 7 to exhibit to the user.

As described above, according to the speech recognizing apparatus of the embodiment 2 in accordance with the present invention, it can correct the recognition result in accordance with the user utterance timing. Accordingly, the speech recognizing apparatus can be constructed in such a manner as to prevent the recognition result that is highly probable of having been recognized erroneously from being exhibited to the user. As a result, it can prevent the words the user does not intend from being recognized.

Embodiment 3

Figure 5:
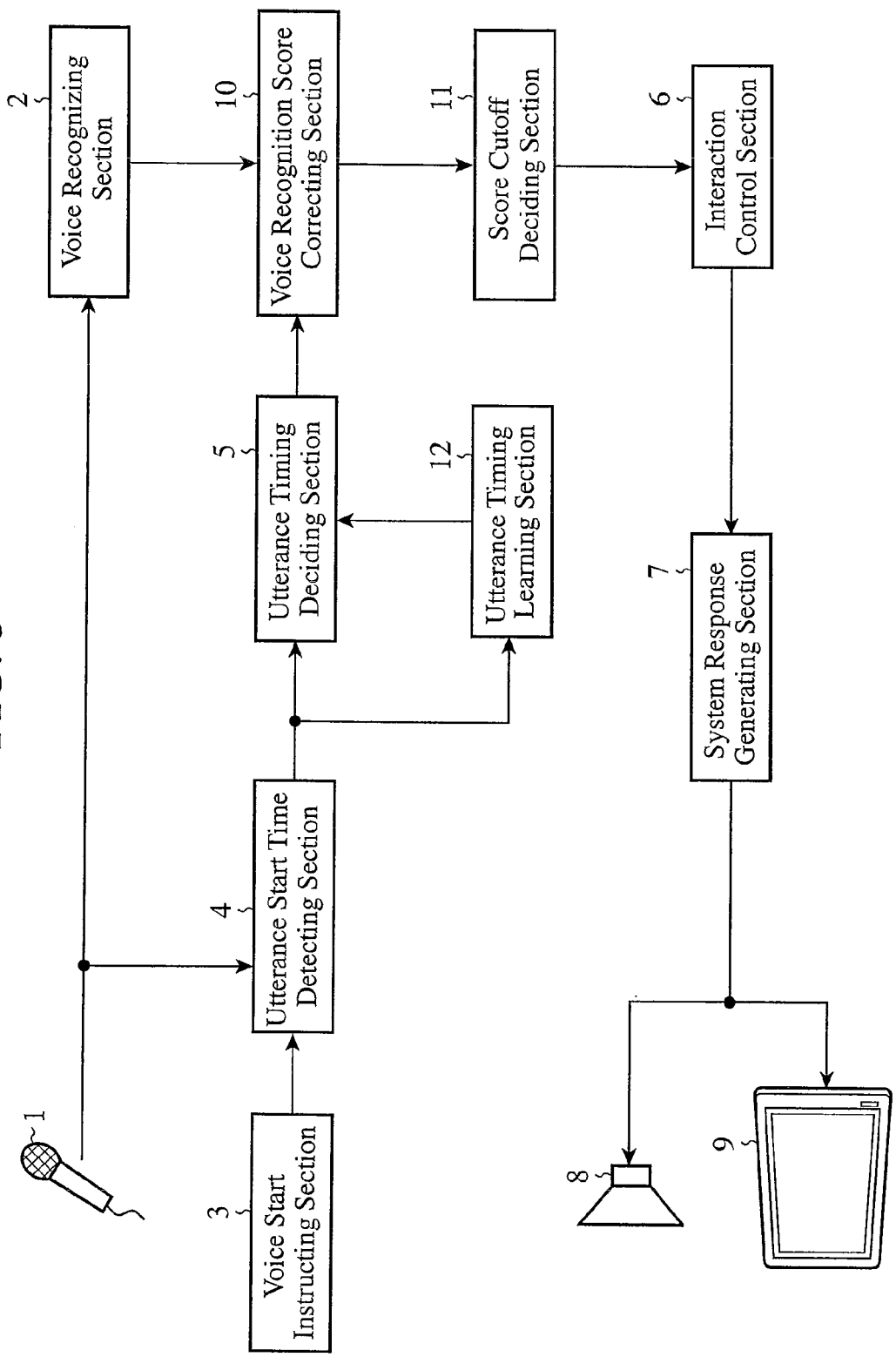
FIG. 5 is a block diagram showing a configuration of a speech recognizing apparatus of an embodiment 3 in accordance with the present invention.

FIG. 5 is a block diagram showing a configuration of a speech recognizing apparatus of an embodiment 3 in accordance with the present invention. The speech recognizing apparatus is constructed by adding to the speech recognizing apparatus of the embodiment 2 an utterance timing learning section 12. In the following, the same or like portions to the components of the speech recognizing apparatus of the embodiment 2 are designated by the same reference numerals used in the embodiment 2 and their description will be omitted or simplified, and the description will be made centering on portions different from the speech recognizing apparatus of the embodiment 2.

In the speech recognizing apparatus of the embodiment 3, the utterance start time detecting section 4 delivers the detected utterance start time to the utterance timing deciding section 5 and to the utterance timing learning section 12 as well.

The utterance timing learning section 12 learns the utterance timing on the basis of the utterance start time delivered from the utterance start time detecting section 4. To be concrete, the utterance timing learning section 12 successively stores the utterance start time delivered from the utterance start time detecting section 4. Then, every time the new utterance start time is delivered from the utterance start time detecting section 4, the utterance timing learning section 12 calculates a mean value of the utterance start time by dividing the utterance start times detected through the plural times of past trials by the number of times of trials, and delivers to the utterance timing deciding section 5 as mean utterance timing.

The utterance timing deciding section 5, using the mean utterance timing delivered from the utterance timing learning section 12 as a prescribed threshold, makes a decision that the utterance timing is "quick" when the utterance start time delivered from the utterance start time detecting section 4 is equal to or less than the prescribed threshold, and that the utterance timing is "slow" when it is greater than the prescribed threshold. Then, it delivers the decided utterance timing to the interaction control section 6.

Figure 6:
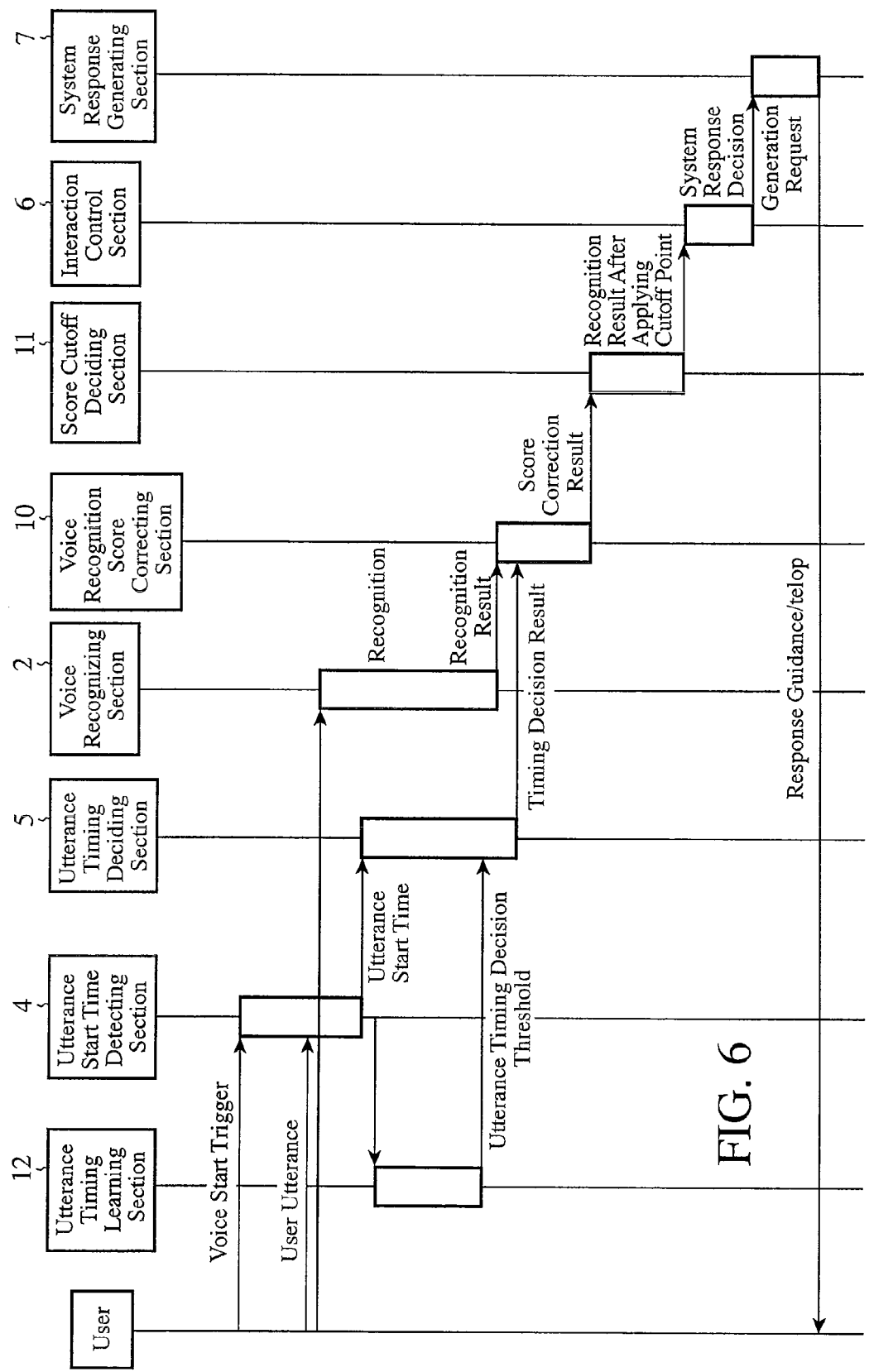
FIG. 6 is a sequence diagram showing the operation of the speech recognizing apparatus of the embodiment 3 in accordance with the present invention.

Next, the operation of the speech recognizing apparatus of the embodiment 3 in accordance with the present invention with the foregoing configuration will be described with reference to a sequence chart shown in FIG. 6.

As for the operation from the time when the speech start trigger is delivered to the utterance start time detecting section 4 in response to a user manipulation of the speech start instructing section 3 to the time when the utterance start time detecting section 4 outputs the utterance start time, it is the same as that of the speech recognizing apparatus of the embodiment 2 described above. The utterance start time output from the utterance start time detecting section 4 is delivered to the utterance timing deciding section 5 and utterance timing learning section 12.

The utterance timing learning section 12 calculates the mean utterance timing on the basis of the utterance start time delivered from the utterance start time detecting section 4, and delivers it to the utterance timing deciding section 5. The utterance timing deciding section 5 decides the utterance timing (quick/slow) by comparing the utterance start time delivered from the utterance start time detecting section 4 with the mean utterance timing delivered from the utterance timing learning section 12, and delivers the decision result to the speech recognition score correcting section 10. On the other hand, the speech recognizing section 2 that receives the speech signal from the speech input section 1 recognizes the speech the user utters on the basis of the speech signal, and delivers the recognition result to the speech recognition score correcting section 10. The operation thereafter is the same as that of the speech recognizing apparatus of the embodiment 2.

As described above, according to the speech recognizing apparatus of the embodiment 3 in accordance with the present invention, since it can dynamically alter the threshold the utterance timing deciding section 5 uses, it can absorb the difference in the utterance timing between individuals.

Incidentally, although the speech recognizing apparatus of the embodiment 3 is constructed by adding the utterance timing learning section 12 to the speech recognizing apparatus of the embodiment 2, it can also be constructed by adding the utterance timing learning section 12 to the speech recognizing apparatus of the embodiment 1. In this case also, it can achieve the same effect and advantages as those of the foregoing speech recognizing apparatus of the embodiment 3.

Embodiment 4

Figure 7:
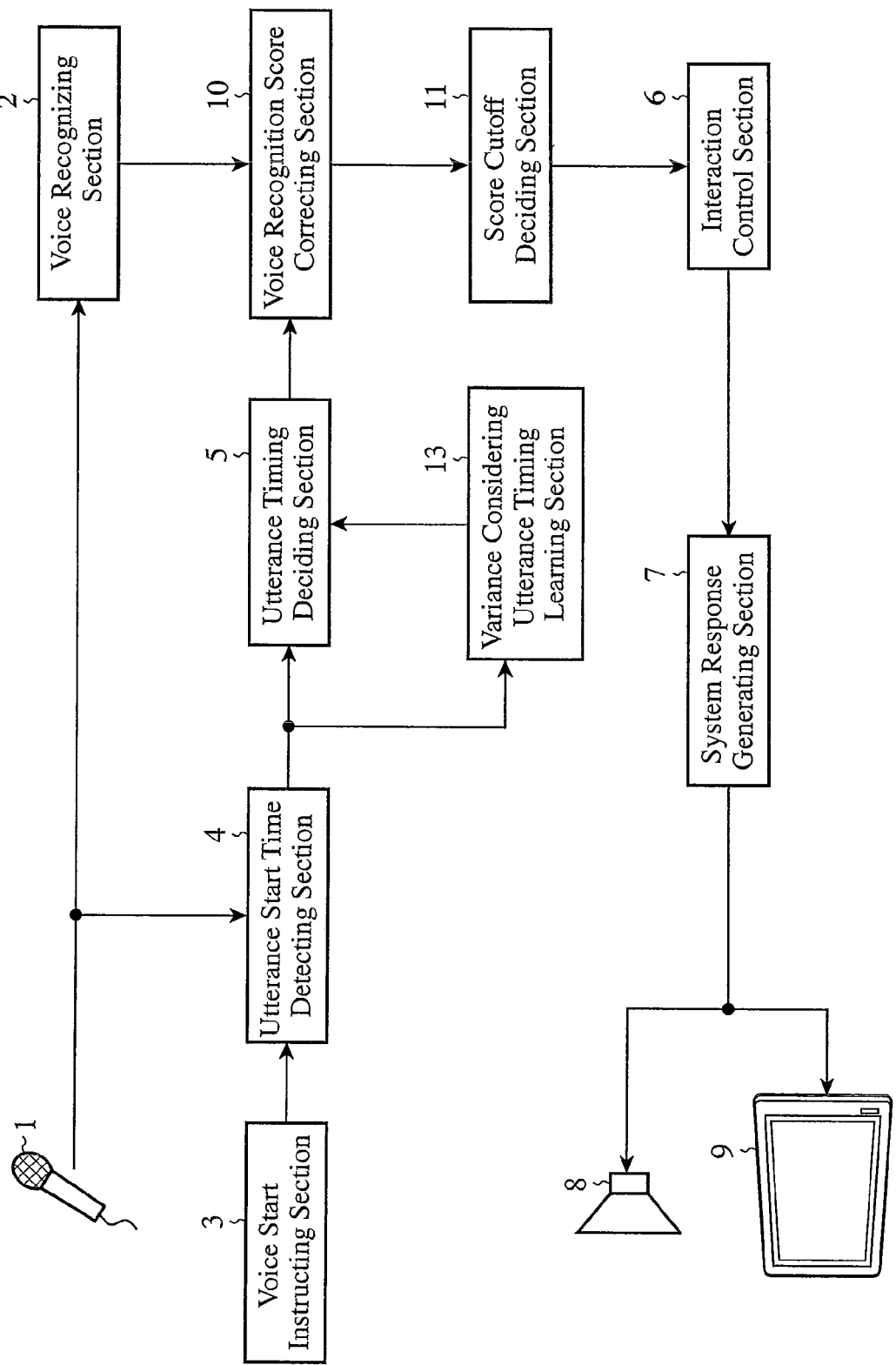
FIG. 7 is a block diagram showing a configuration of a speech recognizing apparatus of an embodiment 4 in accordance with the present invention.

FIG. 7 is a block diagram showing a configuration of a speech recognizing apparatus of an embodiment 4 in accordance with the present invention. The speech recognizing apparatus is constructed by replacing the utterance timing learning section 12 in the speech recognizing apparatus of the embodiment 3 by a variance considering utterance timing learning section 13. In the following, the same or like portions to the components of the speech recognizing apparatus of the embodiment 3 are designated by the same reference numerals used in the embodiment 3 and their description will be omitted, and the description will be made centering on portions different from the speech recognizing apparatus of the embodiment 3.

The variance considering utterance timing learning section 13 learns the utterance timing considering the variance on the basis of the utterance start time delivered from the utterance start time detecting section 4. More specifically, on the basis of the utterance start time delivered from the utterance start time detecting section 4, the variance considering utterance timing learning section 13 calculates an utterance timing decision threshold while considering the variance, and delivers it to the utterance timing deciding section 5. For example, assume that the utterance start times of the user A and user B in past five times are as follows.

<User A>
   first time: 6 [s]
   second time: 7 [s]
   third time: 7 [s]
   fourth time: 7 [s]
   fifth time: 8 [s]
   utterance start mean time [s]: 7
   variance: 0.5
<User B>
   first time: 15 [s]
   second time: 3 [s]
   third time: 6 [s]
   fourth time: 4 [s]
   fifth time: 7 [s]
   utterance start mean time [s]: 7
   variance: 21

As for the user A, the variance becomes small because the distances of the individual data from the mean value are small. On the other hand, as for the user B, the variance becomes large because the distances of the individual data from the mean value are large. The meaning of shifting the prescribed threshold used in the utterance timing deciding section 5 by 1 [s] from the utterance start mean time differs greatly for the user A and user B: The effect is great for the user A, but is small for the user B. Accordingly, when altering the threshold used in the utterance timing deciding section 5 dynamically, it is necessary to alter the threshold considering the magnitude of the variance.

Figure 8:
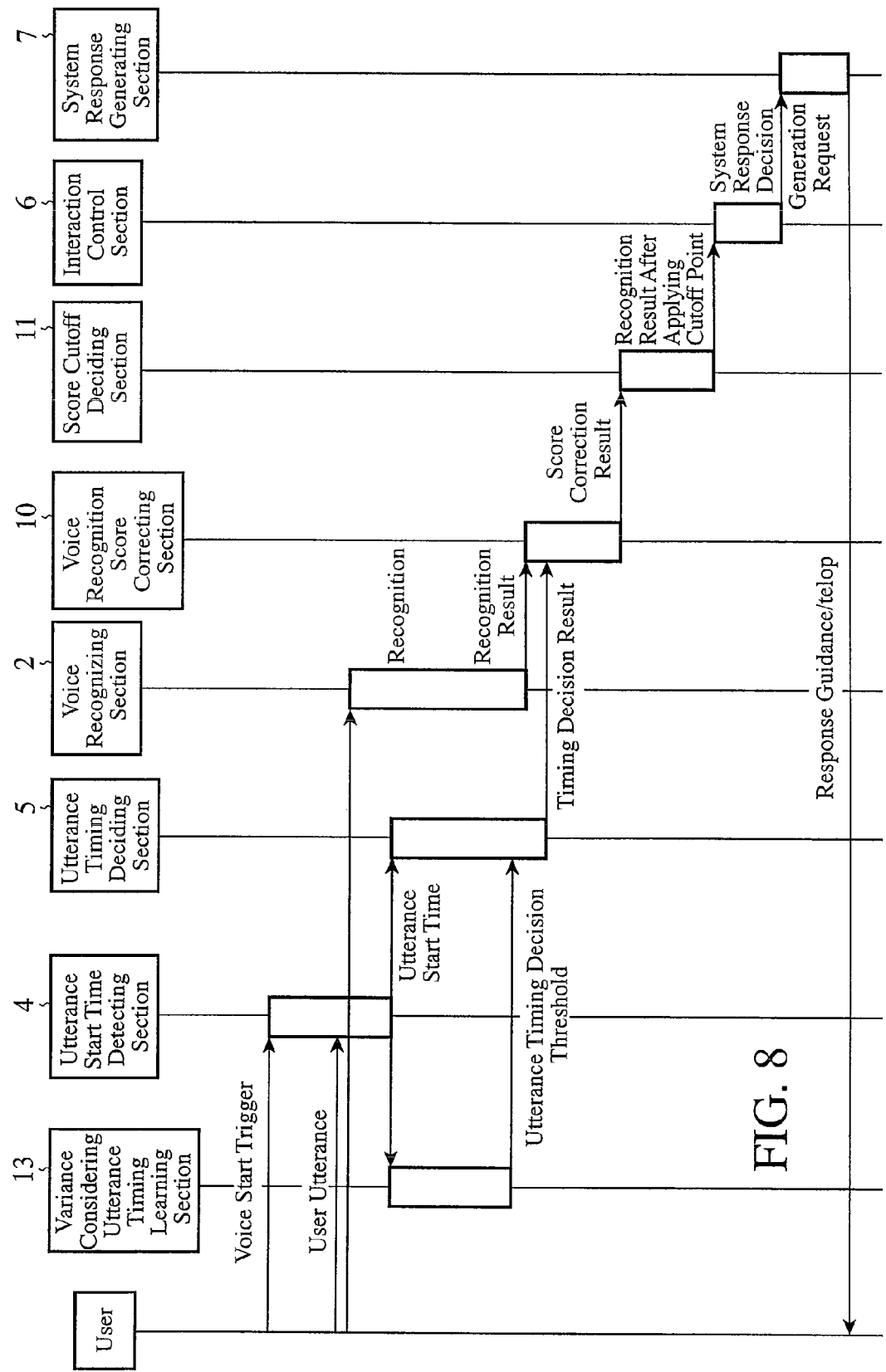
FIG. 8 is a sequence diagram showing the operation of the speech recognizing apparatus of the embodiment 4 in accordance with the present invention.

Next, the operation of the speech recognizing apparatus of the embodiment 4 in accordance with the present invention with the foregoing configuration will be described with reference to a sequence chart shown in FIG. 8.

As for the operation from the time when the speech start trigger is delivered to the utterance start time detecting section 4 in response to a user manipulation of the speech start instructing section 3 to the time when the utterance start time detecting section 4 outputs the utterance start time, it is the same as that of the speech recognizing apparatus of the embodiment 2 described above. The utterance start time output from the utterance start time detecting section 4 is delivered to the utterance timing deciding section 5 and the variance considering utterance timing learning section 13.

The variance considering utterance timing learning section 13 calculates, considering the variance, the utterance timing decision threshold on the basis of the utterance start time delivered from the utterance start time detecting section 4, and delivers it to the utterance timing deciding section 5. The utterance timing deciding section 5 decides the utterance timing (quick/slow) by comparing the utterance start time delivered from the utterance start time detecting section 4 with the utterance timing decision threshold delivered from the variance considering utterance timing learning section 13, and delivers the decision result to the speech recognition score correcting section 10. On the other hand, the speech recognizing section 2 that receives the speech signal from the speech input section 1 recognizes the speech the user utters on the basis of the speech signal, and delivers the recognition result to the speech recognition score correcting section 10. The operation thereafter is the same as that of the speech recognizing apparatus of the embodiment 3.

As described above, according to the speech recognizing apparatus of the embodiment 4 in accordance with the present invention, since it can dynamically alter the threshold the utterance timing deciding section 5 uses by considering the variance of the user utterance, it can absorb fluctuations in the user utterance timing.

Incidentally, although the speech recognizing apparatus of the embodiment 4 is constructed by adding the variance considering utterance timing learning section 13 to the speech recognizing apparatus of the embodiment 2, it can also be constructed by adding the variance considering utterance timing learning section 13 to the speech recognizing apparatus of the embodiment 1. In this case also, it can achieve the same effect and advantages as those of the foregoing speech recognizing apparatus of the embodiment 4.

Embodiment 5

Figure 9:
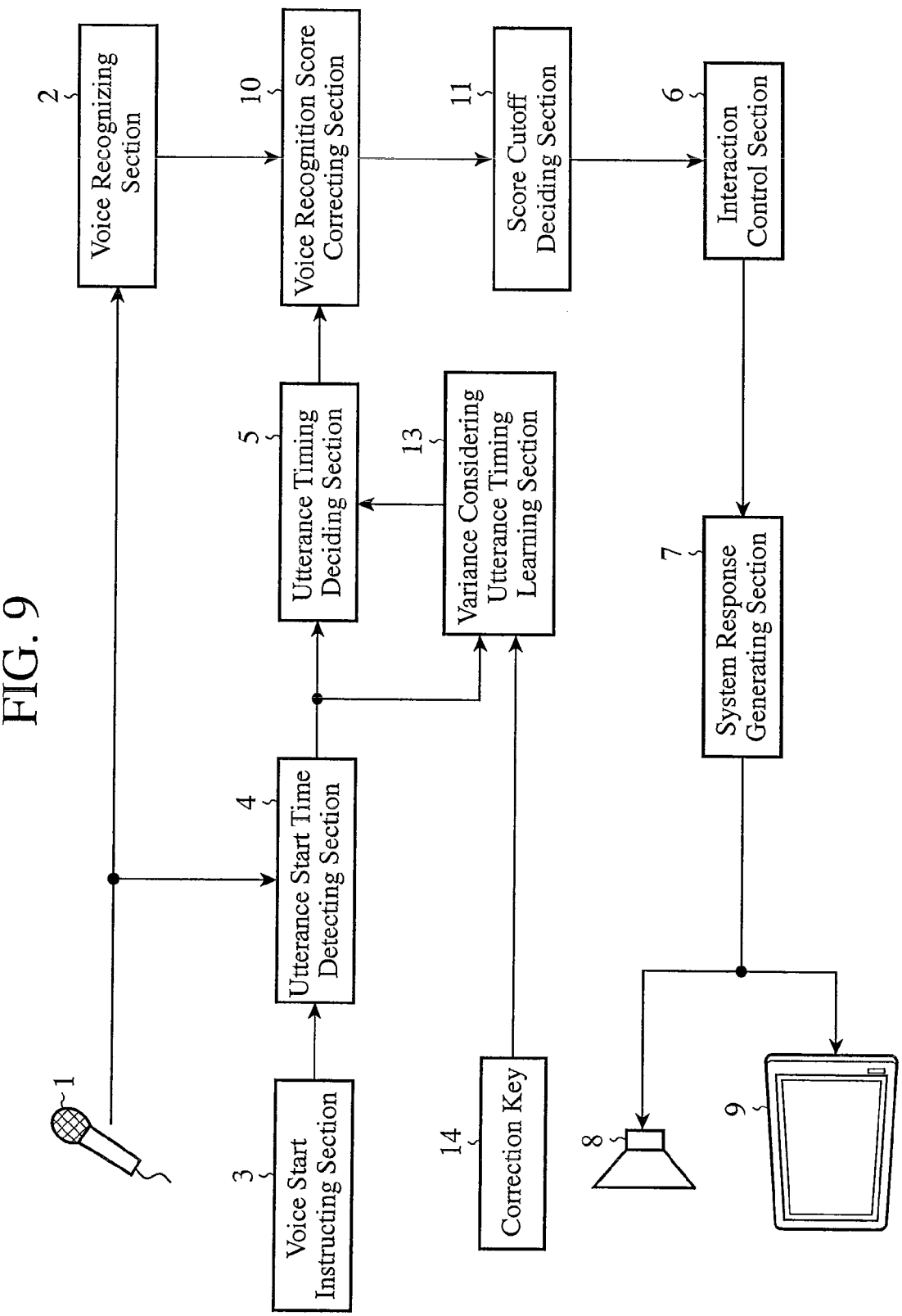
FIG. 9 is a block diagram showing a configuration of a speech recognizing apparatus of an embodiment 5 in accordance with the present invention.

FIG. 9 is a block diagram showing a configuration of a speech recognizing apparatus of an embodiment 5 in accordance with the present invention. The speech recognizing apparatus is constructed by adding a correction key 14 to the speech recognizing apparatus of the embodiment 4, and by altering the function of the variance considering utterance timing learning section 13. In the following, the same or like portions to the components of the speech recognizing apparatus of the embodiment 4 are designated by the same reference numerals used in the embodiment 4 and their description will be omitted, and the description will be made centering on portions different from the speech recognizing apparatus of the embodiment 4.

The correction key 14 is provided on a screen or manipulation section (not shown), for example, and is used for instructing to cancel the last recognition result by pushing it down after the recognition result is exhibited to the user. A correcting signal indicating that the correction key 14 is pushed down is delivered to the variance considering utterance timing learning section 13.

The variance considering utterance timing learning section 13 learns the utterance timing considering the variance on the basis of the utterance start time delivered from the utterance start time detecting section 4 and the correcting signal delivered from the correction key 14. More specifically, the variance considering utterance timing learning section 13 calculates the utterance timing decision threshold considering the variance on the basis of the utterance start time delivered from the utterance start time detecting section 4 and the duration from the time when the speech output section 8 outputs the response guidance in speech or from the time when the telop output section 9 displays the telop to the time when the correction key 14 instructs the cancellation. The utterance timing decision threshold calculated by the variance considering utterance timing learning section 13 is delivered to the utterance timing deciding section 5.

Figure 10:
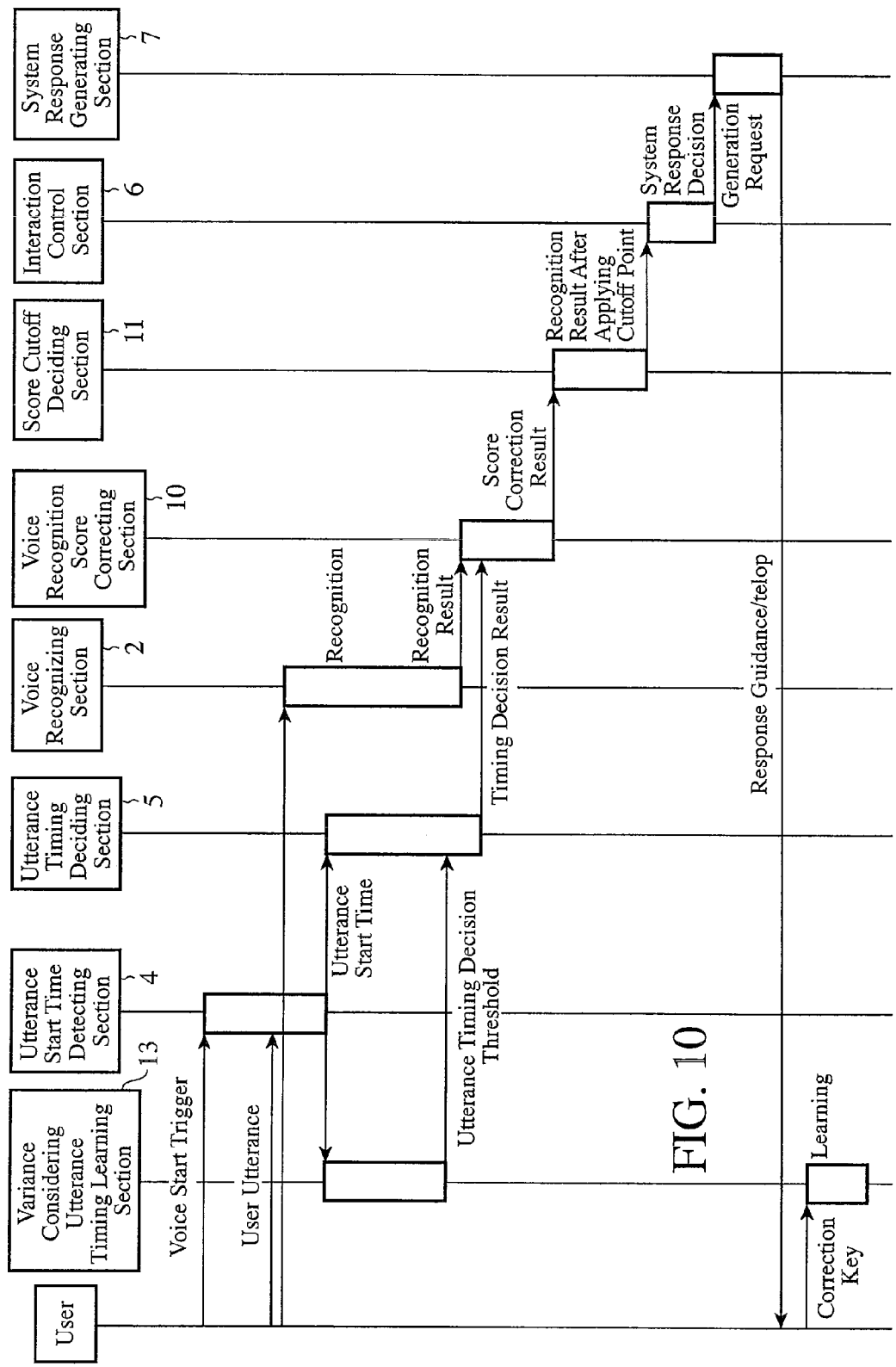
FIG. 10 is a sequence diagram showing the operation of the speech recognizing apparatus of the embodiment 5 in accordance with the present invention.

Next, the operation of the speech recognizing apparatus of the embodiment 5 in accordance with the present invention with the foregoing configuration will be described with reference to a sequence chart shown in FIG. 10.

As for the operation from the time when the speech start trigger is delivered to the utterance start time detecting section 4 in response to a user manipulation of the speech start instructing section 3 to the time when the utterance start time detecting section 4 outputs the utterance start time, it is the same as that of the speech recognizing apparatus of the embodiment 2 described above. The utterance start time output from the utterance start time detecting section 4 is delivered to the utterance timing deciding section 5 and the utterance timing learning section 12.

On the other hand, the speech output section 8 has output the response guidance in speech and the telop output section 9 has displayed the telop previously, and when the correction key 14 is pushed down in this state, the correcting signal indicating that effect is delivered to the variance considering utterance timing learning section 13. The variance considering utterance timing learning section 13 calculates the utterance timing decision threshold considering the variance on the basis of the utterance start time delivered from the utterance start time detecting section 4 and the duration from the time when the speech output section 8 outputs the response guidance in speech or from the time when the telop output section 9 displays the telop to the time when the correction key 14 instructs the cancellation, and delivers it to the utterance timing deciding section 5.

The utterance timing deciding section 5 decides the utterance timing (quick/slow) by comparing the utterance start time delivered from the utterance start time detecting section 4 with the utterance timing decision threshold delivered from the variance considering utterance timing learning section 13, and delivers the decision result to the speech recognition score correcting section 10. On the other hand, the speech recognizing section 2 that receives the speech signal from the speech input section 1 recognizes the speech the user utters on the basis of the speech signal, and delivers the recognition result to the speech recognition score correcting section 10. The operation thereafter is the same as that of the speech recognizing apparatus of the embodiment 3.

As described above, according to the speech recognizing apparatus of the embodiment 5 in accordance with the present invention, since it carries out learning considering the information about the result of the recognition and the duration up to the pressing of the correction key 14 to generate the utterance timing decision threshold, it can make the learning of the utterance timing more robust.

Incidentally, although the speech recognizing apparatus of the embodiment 5 is constructed by adding the correction key 14 to the speech recognizing apparatus of the embodiment 4, it can also be constructed by adding the correction key 14 to the speech recognizing apparatus of the embodiment 2 or embodiment 3. In this case also, it can achieve the same effect and advantages as those of the foregoing speech recognizing apparatus of the embodiment 5.

Embodiment 6

Figure 11:
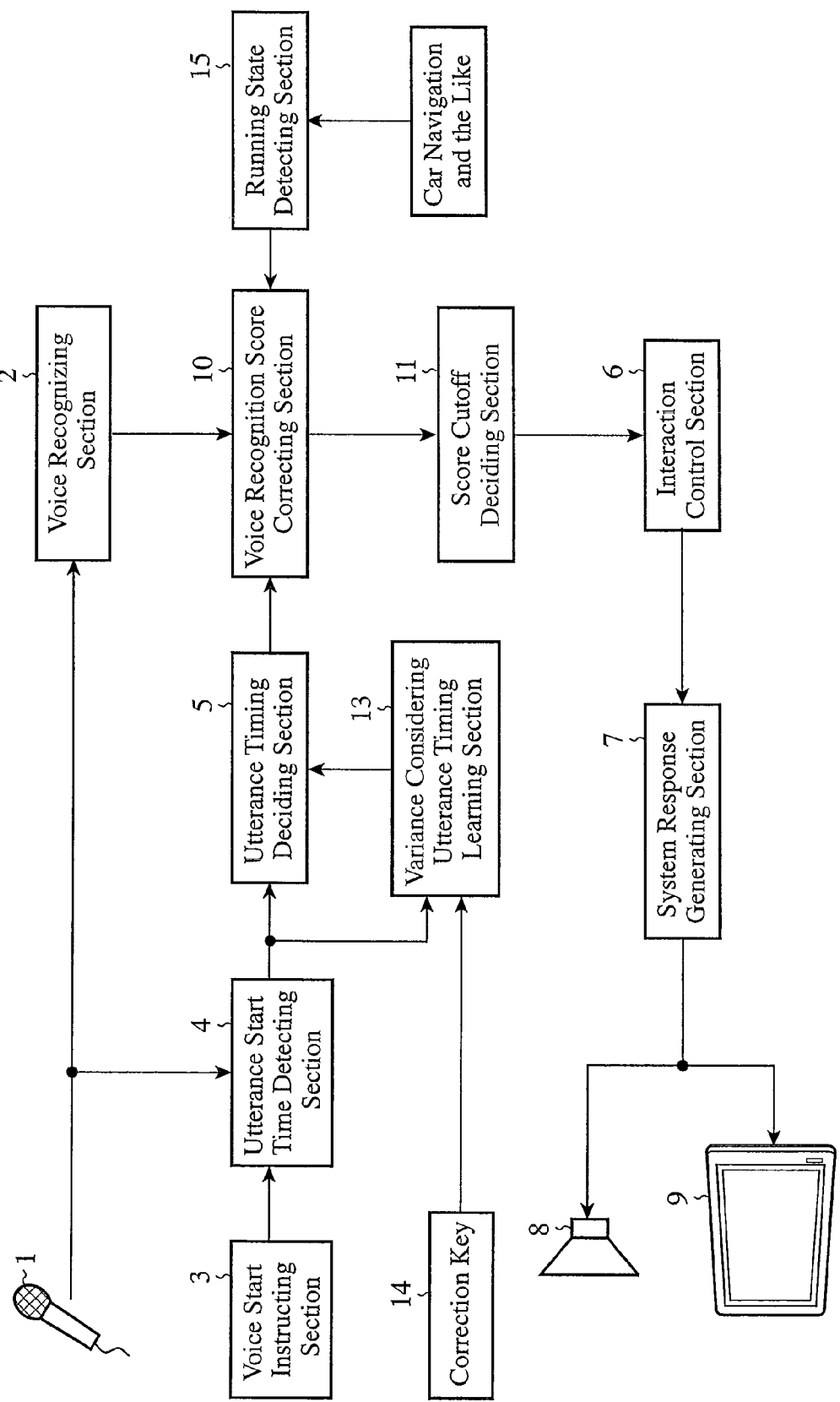
FIG. 11 is a block diagram showing a configuration of a speech recognizing apparatus of an embodiment 6 in accordance with the present invention.

FIG. 11 is a block diagram showing a configuration of a speech recognizing apparatus of an embodiment 6 in accordance with the present invention. The speech recognizing apparatus is constructed by adding a running state detecting section 15 to the speech recognizing apparatus of the embodiment 5, and by altering the function of the speech recognition score correcting section 10. In the following, the same or like portions to the components of the speech recognizing apparatus of the embodiment 5 are designated by the same reference numerals used in the embodiment 5 and their description will be omitted, and the description will be made centering on portions different from the speech recognizing apparatus of the embodiment 5.

As the running state detecting section 15, a location detecting unit for detecting the present position, which is provided in a car navigation system or the like, can be used. The running state detecting section 15 detects the running state on the basis of position information obtained by the location detecting unit. The data showing the running state detected by the running state detecting section 15 is delivered to the speech recognition score correcting section 10. Incidentally, the running state detecting section 15 can also be constructed in such a manner that it detects a driving operation state in addition to the running state detected on the basis of the position information. In this case, the data showing the running state or driving operation state detected by the running state detecting section 15 is delivered to the speech recognition score correcting section 10.

Alternatively, as the running state detecting section 15, an acceleration detecting unit for detecting the acceleration, which is provided in the car navigation system or the like, can be used. In this case, the running state detecting section 15 detects the running state on the basis of the acceleration obtained by the acceleration detecting unit. The data showing the running state detected by the running state detecting section 15 is delivered to the speech recognition score correcting section 10. Incidentally, the running state detecting section 15 can also be constructed in such a manner that it detects a driving operation state in addition to the running state detected on the basis of the acceleration. In this case, the data showing the running state or driving operation state detected by the running state detecting section 15 is delivered to the speech recognition score correcting section 10.

Furthermore, as the running state detecting section 15, both the location detecting unit for detecting the present position and the acceleration detecting unit for detecting the acceleration, which are provided in the car navigation system or the like, can be used. The running state detecting section 15 detects the running state on the basis of the position information obtained by the location detecting unit and the acceleration obtained by the acceleration detecting unit. The data showing the running state detected by the running state detecting section 15 is delivered to the speech recognition score correcting section 10. Incidentally, the running state detecting section 15 can also be constructed in such a manner that it detects a driving operation state in addition to the running state detected on the basis of the position information and acceleration. In this case, the data showing the running state or driving operation state detected by the running state detecting section 15 is delivered to the speech recognition score correcting section 10.

The speech recognition score correcting section 10 corrects the speech recognition score of the words delivered from the speech recognizing section 2 in accordance with the utterance timing delivered from the utterance timing deciding section 5 and the data indicating the running state delivered from the running state detecting section 15. For example, when it judges that the vehicle is running on an expressway from the data indicating the running state, it considers that the steering or pedaling will not occur often. Accordingly, when the timing of the utterance occurs at about the same time, it corrects in such a manner as to reduce the speech recognition score. The words, to which the speech recognition score corrected by the speech recognition score correcting section 10 is annexed, are delivered to the score cutoff deciding section 11.

Figure 12:
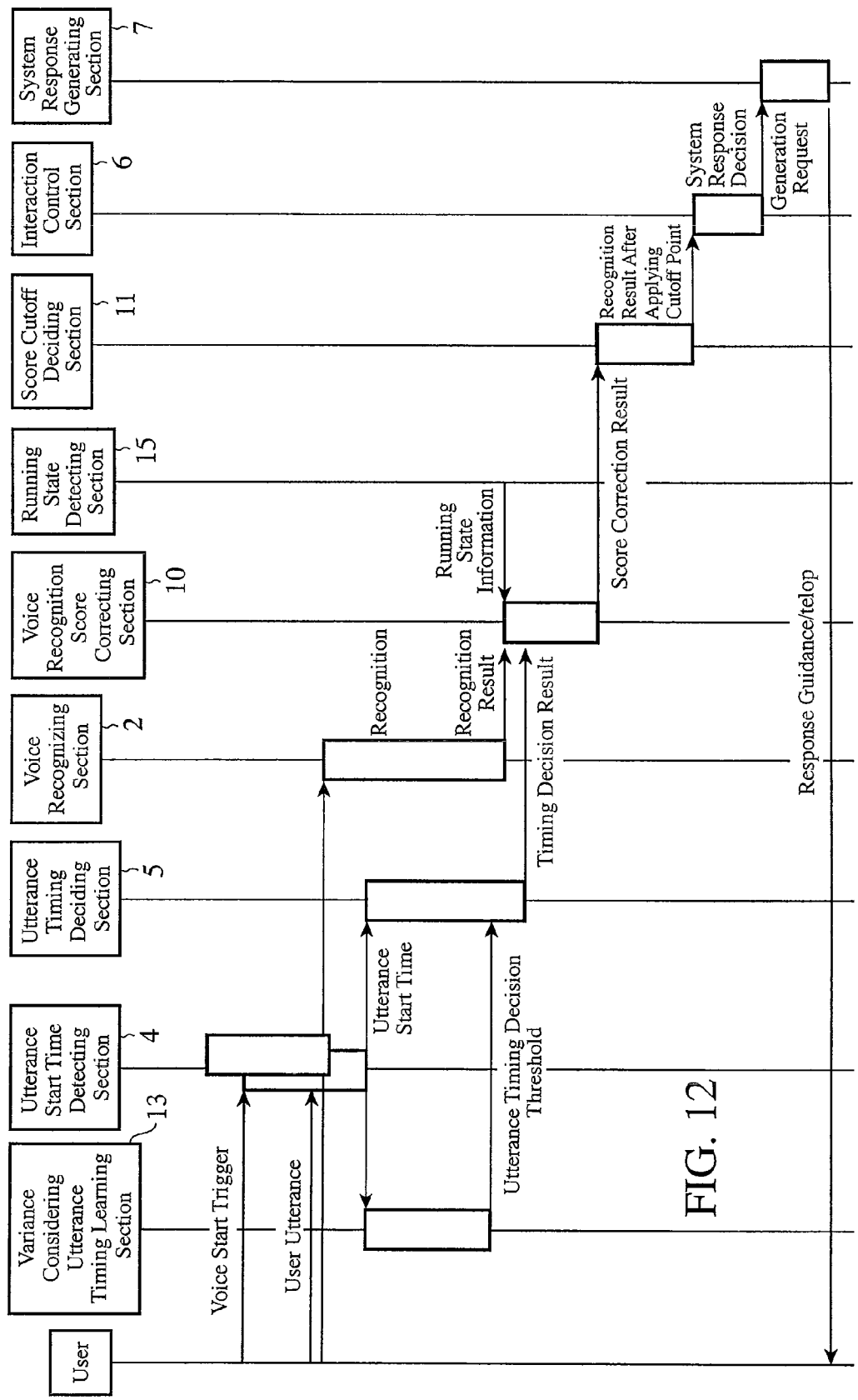
FIG. 12 is a sequence diagram showing the operation of the speech recognizing apparatus of the embodiment 6 in accordance with the present invention.

Next, the operation of the speech recognizing apparatus of the embodiment 6 in accordance with the present invention with the foregoing configuration will be described with reference to a sequence chart shown in FIG. 12. Incidentally, the operation of the correction key 14 is omitted from FIG. 12.

As for the operation from the time when the speech start trigger is delivered to the utterance start time detecting section 4 in response to a user manipulation of the speech start instructing section 3 to the time when the utterance timing (quick/slow) is delivered from the utterance timing deciding section 5 to the speech recognition score correcting section 10, and as for the operation in which the speech recognizing section 2 that receives the speech signal from the speech input section 1 delivers the recognition result to the speech recognition score correcting section 10, they are the same as those of the speech recognizing apparatus of the embodiment 5 described above.

The speech recognition score correcting section 10 that receives the recognition result from the speech recognizing section 2 corrects the speech recognition score of the words delivered from the speech recognizing section 2 in accordance with the utterance timing delivered from the utterance timing deciding section 5 and the data indicating the running state delivered from the running state detecting section 15, annexes the speech recognition score to the words, and delivers to the score cutoff deciding section 11. The operation thereafter is the same as that of the speech recognizing apparatus of the embodiment 2.

As described above, according to the speech recognizing apparatus of the embodiment 6 in accordance with the present invention, since it can detect the running state such as the present position, for example, and can judge whether the shift of the utterance timing is due to the running state or not, it can provide the user with the recognition result or response guidance considering the running state.

Incidentally, although the speech recognizing apparatus of the embodiment 6 is constructed by adding the running state detecting section 15 to the speech recognizing apparatus of the embodiment 5, it can also be constructed by adding the running state detecting section 15 to the speech recognizing apparatus of any one of the embodiment 2 to embodiment 4. In this case also, it can achieve the same effect and advantages as those of the foregoing speech recognizing apparatus of the embodiment 6.

Embodiment 7

Figure 13:
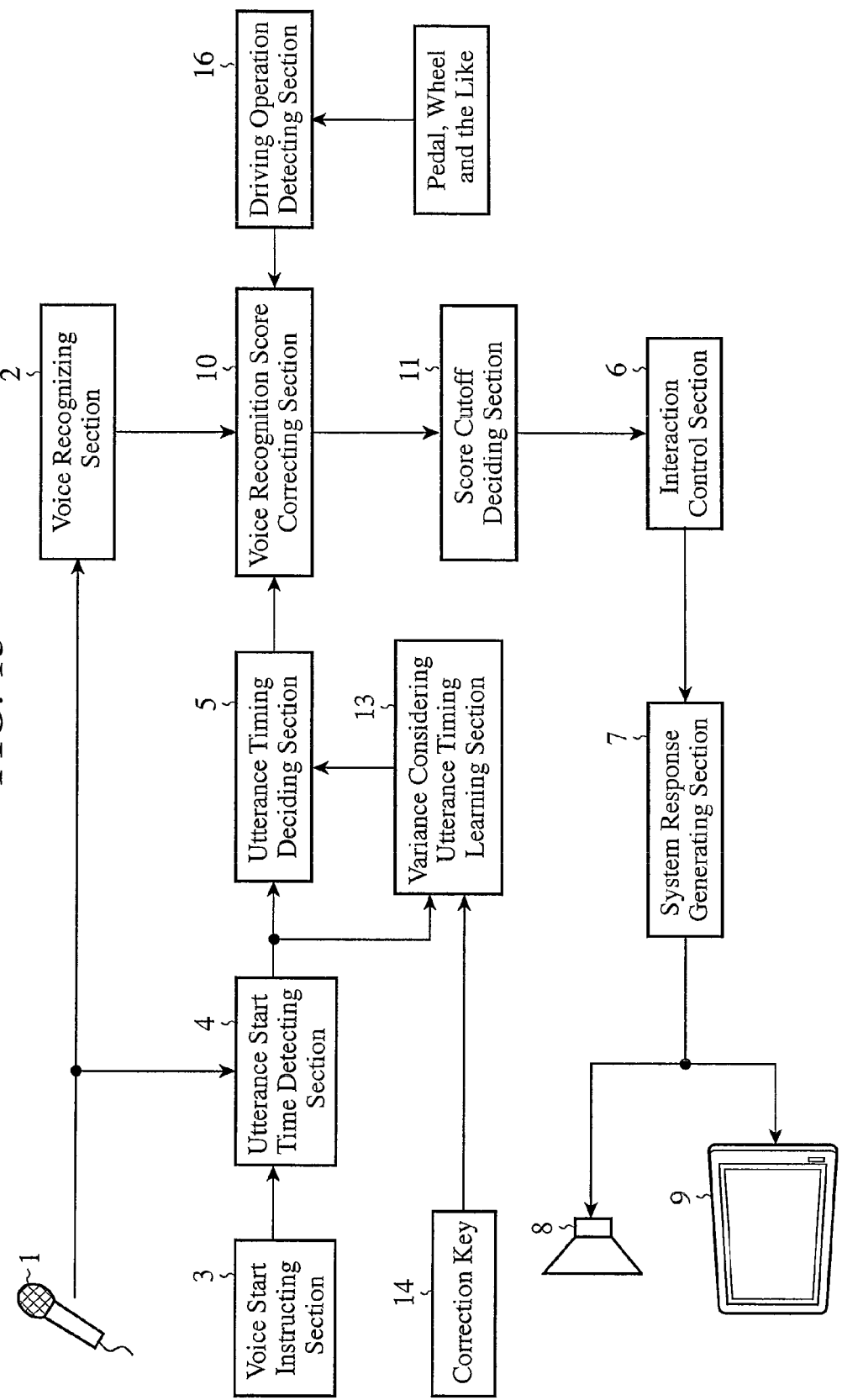
FIG. 13 is a block diagram showing a configuration of a speech recognizing apparatus of an embodiment 7 in accordance with the present invention.

FIG. 13 is a block diagram showing a configuration of a speech recognizing apparatus of an embodiment 7 in accordance with the present invention. The speech recognizing apparatus is constructed by adding a driving operation detecting section 16 to the speech recognizing apparatus of the embodiment 5, and by altering the function of the speech recognition score correcting section 10. In the following, the same or like portions to the components of the speech recognizing apparatus of the embodiment 5 are designated by the same reference numerals used in the embodiment 5 and their description will be omitted, and the description will be made centering on portions different from the speech recognizing apparatus of the embodiment 5.

The driving operation detecting section 15 detects the present driving operation state from signals delivered from the accelerator pedal, brake pedal or wheel of the vehicle (none of them is shown). The data indicating the driving operation detected by the driving operation detecting section 16 is delivered to the speech recognition score correcting section 10.

The speech recognition score correcting section 10 corrects the speech recognition score of the words delivered from the speech recognizing section 2 in accordance with the utterance timing delivered from the utterance timing deciding section 5 and the data indicating the driving operation delivered from the driving operation detecting section 16. For example, when it judges that the vehicle is reversing from the data indicating the driving operation, it considers that the user concentrates his or her mind on watching the surroundings. Accordingly, even when the timing of the utterance occurs at about the same time, it does not correct in such a manner as to reduce the speech recognition score. The words, to which the speech recognition score corrected by the speech recognition score correcting section 10 is annexed, are delivered to the score cutoff deciding section 11.

Figure 14:
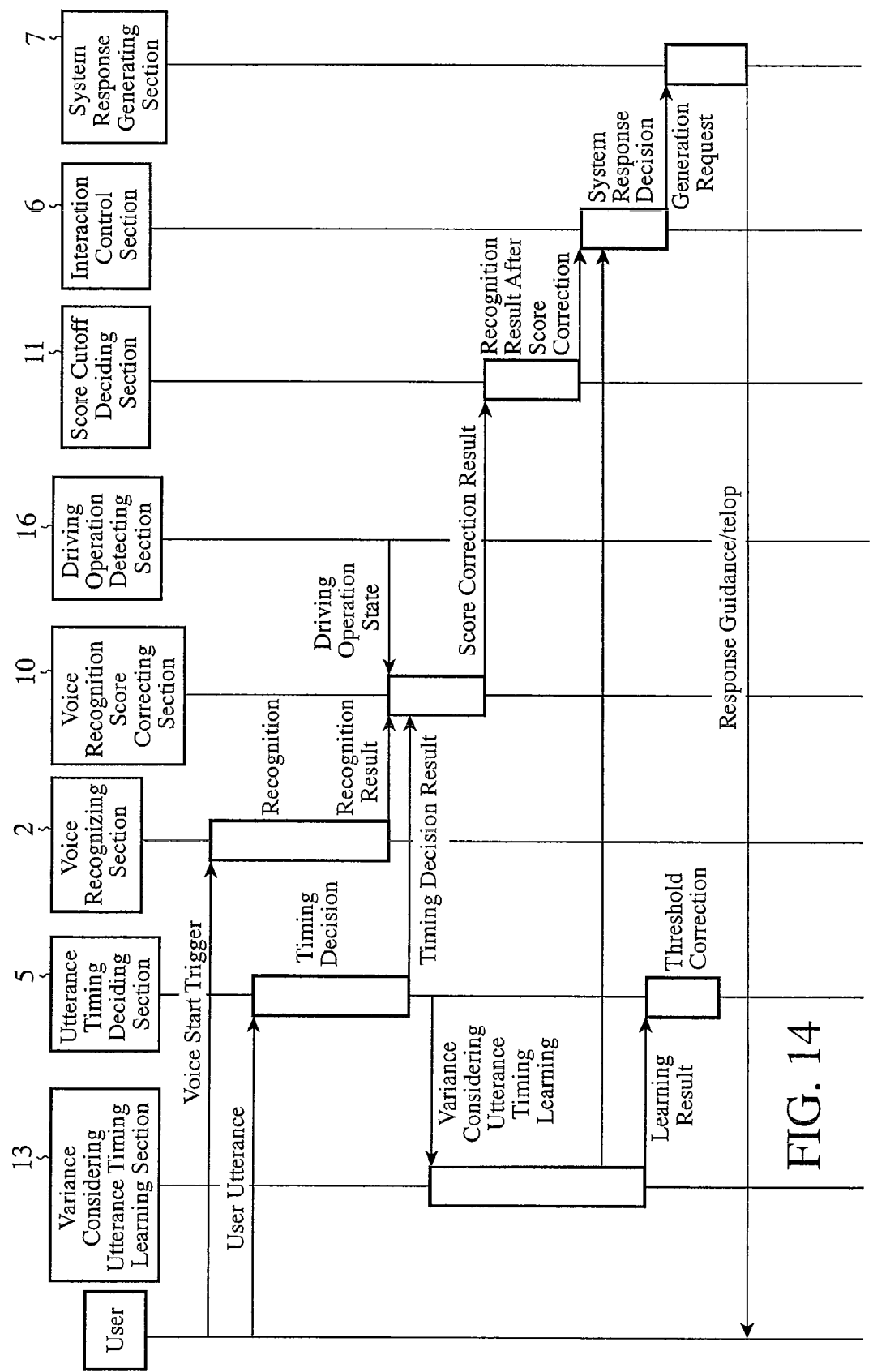
FIG. 14 is a sequence diagram showing the operation of the speech recognizing apparatus of the embodiment 7 in accordance with the present invention.

Next, the operation of the speech recognizing apparatus of the embodiment 7 in accordance with the present invention with the foregoing configuration will be described with reference to a sequence chart shown in FIG. 14. Incidentally, the operation of the correction key 14 is omitted from FIG. 14.

As for the operation from the time when the speech start trigger is delivered to the utterance start time detecting section 4 in response to a user manipulation of the speech start instructing section 3 to the time when the utterance timing (quick/slow) is delivered from the utterance timing deciding section 5 to the speech recognition score correcting section 10, and as for the operation in which the speech recognizing section 2 that receives the speech signal from the speech input section 1 delivers the recognition result to the speech recognition score correcting section 10, they are the same as those of the speech recognizing apparatus of the embodiment 5 described above.

The speech recognition score correcting section 10 that receives the recognition result from the speech recognizing section 2 corrects the speech recognition score of the words delivered from the speech recognizing section 2 in accordance with the utterance timing delivered from the utterance timing deciding section 5 and the data indicating driving operation state delivered from the driving operation detecting section 16, annexes the speech recognition score to the words, and delivers to the score cutoff deciding section 11. The operation thereafter is the same as that of the speech recognizing apparatus of the embodiment 2.

As described above, according to the speech recognizing apparatus of the embodiment 7 in accordance with the present invention, since it can detect the driving operation state such as rounding a curve, for example, and can judge whether the shift of the utterance timing is due to the driving operation state or not, it can provide the user with the recognition result or response guidance considering the driving operation state.

Incidentally, although the speech recognizing apparatus of the embodiment 7 is constructed by adding the driving operation detecting section 16 to the speech recognizing apparatus of the embodiment 5, it can also be constructed by adding the driving operation detecting section 16 to the speech recognizing apparatus of any one of the embodiment 2 to embodiment 4. In this case also, it can achieve the same effect and advantages as those of the foregoing speech recognizing apparatus of the embodiment 7.

Embodiment 8

Figure 15:
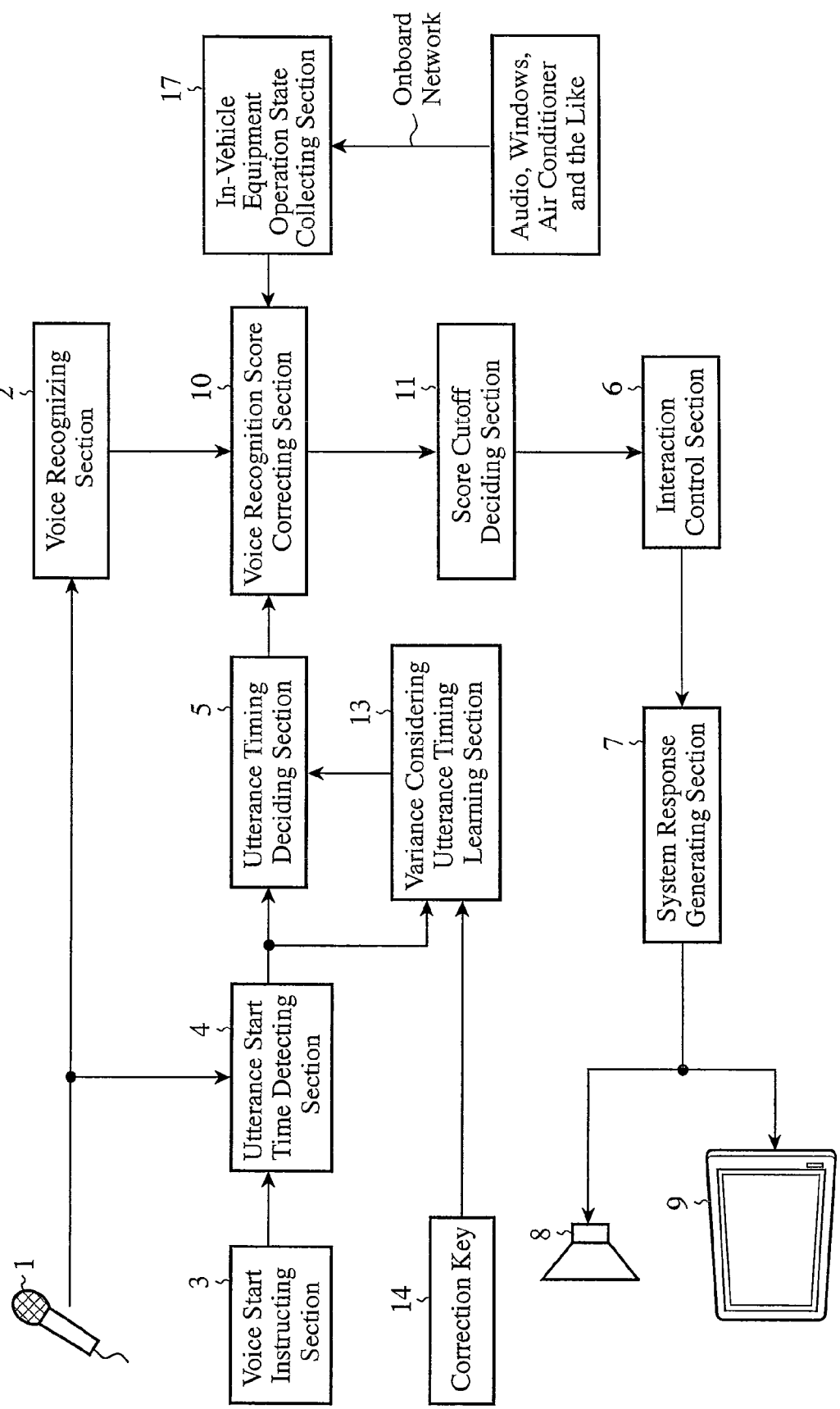
FIG. 15 is a block diagram showing a configuration of a speech recognizing apparatus of an embodiment 8 in accordance with the present invention.

FIG. 15 is a block diagram showing a configuration of a speech recognizing apparatus of an embodiment 8 in accordance with the present invention. The speech recognizing apparatus is constructed by adding an in-vehicle equipment operation state collecting section 17 to the speech recognizing apparatus of the embodiment 5, and by altering the function of the speech recognition score correcting section 10. In the following, the same or like portions to the components of the speech recognizing apparatus of the embodiment 5 are designated by the same reference numerals used in the embodiment 5 and their description will be omitted, and the description will be made centering on portions different from the speech recognizing apparatus of the embodiment 5.

The in-vehicle equipment operation state collecting section 17 collects data indicating the operation state of in-vehicle equipment (including onboard equipment) such as windows, doors, air conditioner and car audio equipment which are connected via an onboard network such as a CAN (Controller Area Network), MOST (Media Oriented Systems Transport), LAN (Local Area Network) or FlexRay. The data indicating the operation state of the in-vehicle equipment detected by the driving operation detecting section 16 are delivered to the speech recognition score correcting section 10.

The speech recognition score correcting section 10 corrects the speech recognition score of the words delivered from the speech recognizing section 2 in accordance with the utterance timing delivered from the utterance timing deciding section 5 and the data indicating the operation state of the in-vehicle equipment delivered from the driving operation detecting section 16. For example, when it judges that the user is manipulating the air conditioner, it considers that the user has his or her attention attracted to the manipulation. Accordingly, even when the timing of the utterance occurs at about the same time, it correct in such a manner as to reduce the speech recognition score. The words, to which the speech recognition score corrected by the speech recognition score correcting section 10 is annexed, are delivered to the score cutoff deciding section 11.

Figure 16:
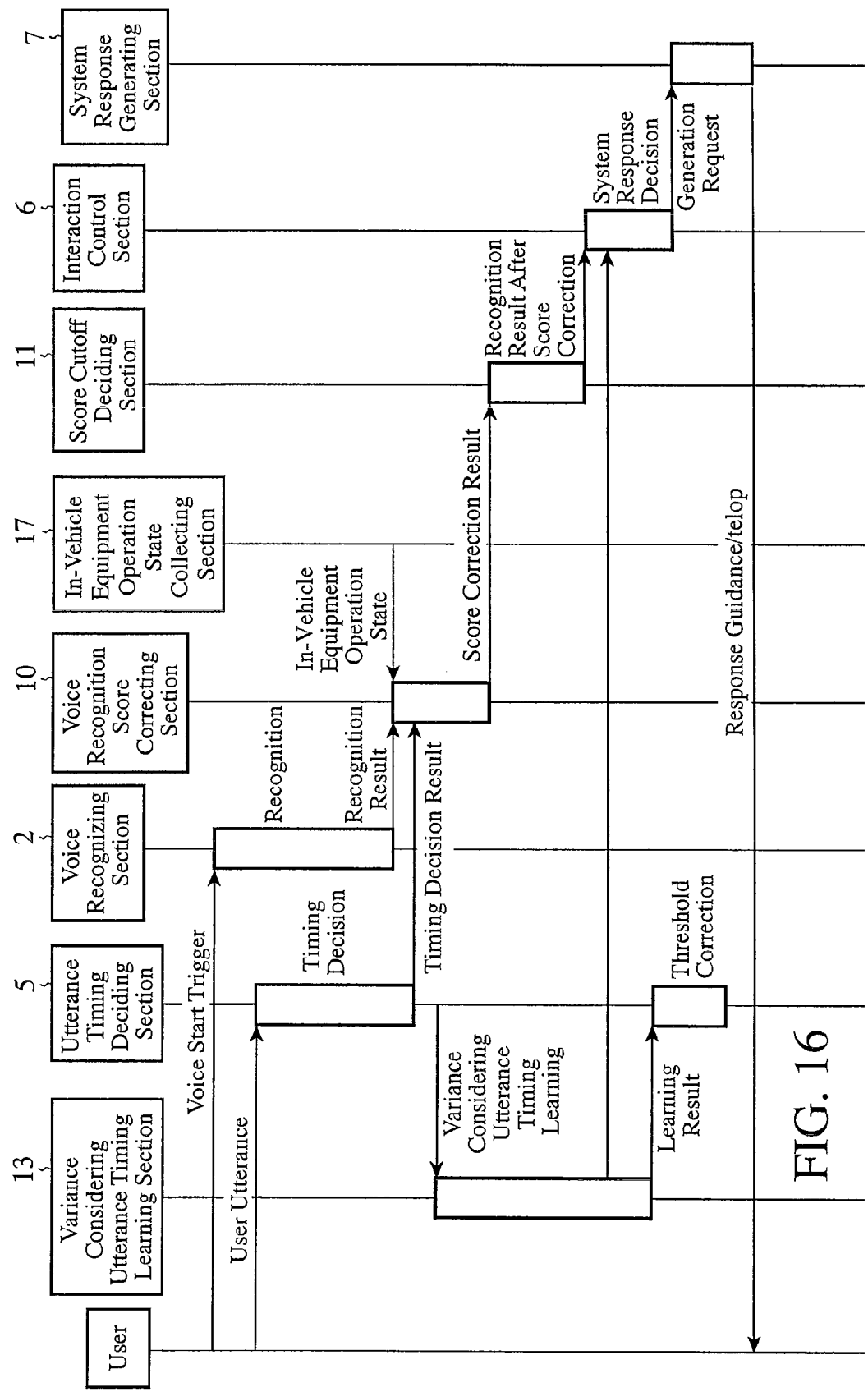
FIG. 16 is a sequence diagram showing the operation of the speech recognizing apparatus of the embodiment 8 in accordance with the present invention.

Next, the operation of the speech recognizing apparatus of the embodiment 8 in accordance with the present invention with the foregoing configuration will be described with reference to a sequence chart shown in FIG. 16. Incidentally, the operation of the correction key 14 is omitted from FIG. 16.

As for the operation from the time when the speech start trigger is delivered to the utterance start time detecting section 4 in response to a user manipulation of the speech start instructing section 3 to the time when the utterance timing (quick/slow) is delivered from the utterance timing deciding section 5 to the speech recognition score correcting section 10, and as for the operation in which the speech recognizing section 2 that receives the speech signal from the speech input section 1 delivers the recognition result to the speech recognition score correcting section 10, they are the same as those of the speech recognizing apparatus of the embodiment 5 described above.

The speech recognition score correcting section 10 that receives the recognition result from the speech recognizing section 2 corrects the speech recognition score of the words delivered from the speech recognizing section 2 in accordance with the utterance timing delivered from the utterance timing deciding section 5 and the data indicating the operation state of the in-vehicle equipment delivered from the in-vehicle equipment operation state collecting section 17, annexes the speech recognition score to the words, and delivers to the score cutoff deciding section 11. The operation thereafter is the same as that of the speech recognizing apparatus of the embodiment 2.

As described above, according to the speech recognizing apparatus of the embodiment 8 in accordance with the present invention, it can provide the user with the recognition result or response guidance considering the operation state of the in-vehicle equipment such as opening or shutting of the windows or doors, control of the air conditioner and the running state.

Incidentally, although the speech recognizing apparatus of the embodiment 8 is constructed by adding the in-vehicle equipment operation state collecting section 17 to the speech recognizing apparatus of the embodiment 5, it can also be constructed by adding the in-vehicle equipment operation state collecting section 17 to the speech recognizing apparatus of anyone of the embodiment 2 to embodiment 4. In this case also, it can achieve the same effect and advantages as those of the foregoing speech recognizing apparatus of the embodiment 8.

INDUSTRIAL APPLICABILITY

As described above, since the speech recognizing apparatus in accordance with the present invention is configured in such a manner as to output a system response with a content corresponding to the utterance timing in order to output appropriate telop and system response, it is suitable for on board terminals enabling operation by utterance.

What is claimed is:

1. A speech recognizing apparatus comprising:
   a speech start instructing section for receiving a non-verbal instruction to start speech recognition;
   a speech input section for receiving uttered speech and for converting it to a speech signal;
   a speech recognizing section for recognizing the speech on the basis of the speech signal delivered from the speech input section;
   an utterance start time detecting section for detecting a duration of time starting when the speech start instructing section instructs to start the speech recognition and concluding when a speech signal is first delivered from the speech input section after the instruction to start speech recognition is received;
   an utterance timing deciding section for deciding utterance timing indicating whether an utterance start is quick or slow by comparing the duration detected by the utterance start time detecting section with a prescribed threshold;
   a speech recognition score correcting section for correcting a speech recognition score of words recognized by the speech recognizing section in accordance with the utterance timing decided by the utterance timing deciding section;
   a score cutoff deciding section for deciding whether to provide a recognition result or not in accordance with the speech recognition score corrected by the speech recognition score correcting section;
   an interaction control section for determining, in accordance with the decision result of the score cutoff deciding section, a content to be shown when exhibiting the recognition result of the speech recognizing section;
   a system response generating section for generating a system response on the basis of the content to be shown determined by the interaction control section; and
   an output section for outputting the system response generated by the system response generating section.

2. The speech recognizing apparatus according to claim 1, further comprising:

a running state detecting section for detecting a running state, wherein
the speech recognition score correcting section corrects the speech recognition score of the words recognized by the speech recognizing section in accordance with the utterance timing decided by the utterance timing deciding section and the running state detected by the running state detecting section.

3. The speech recognizing apparatus according to claim 2, wherein
the running state detecting section is composed of a location detecting unit for detecting the present position and for outputting as position information; and
the speech recognition score correcting section corrects the speech recognition score of the words recognized by the speech recognizing section in accordance with the utterance timing decided by the utterance timing deciding section and the running state or driving operation state decided on the basis of the position information output from the location detecting unit.

4. The speech recognizing apparatus according to claim 2, wherein
the running state detecting section is composed of an acceleration detecting unit for detecting acceleration; and
the speech recognition score correcting section corrects the speech recognition score of the words recognized by the speech recognizing section in accordance with the utterance timing decided by the utterance timing deciding section and the running state and driving operation state decided on the basis of the acceleration detected by the acceleration detecting unit.

5. The speech recognizing apparatus according to claim 2, wherein
the running state detecting section is composed of a location detecting unit for detecting the present position and for outputting as position information, and an acceleration detecting unit for detecting acceleration; and
the speech recognition score correcting section corrects the speech recognition score of the words recognized by the speech recognizing section in accordance with the utterance timing decided by the utterance timing deciding section, the running state decided on the basis of the position information output from the location detecting unit, and the driving operation state decided on the basis of the acceleration detected by the acceleration detecting unit.

6. The speech recognizing apparatus according to claim 1, further comprising:
an in-vehicle equipment operation state collecting section for collecting an operation state of in-vehicle equipment via an onboard network, wherein
the speech recognition score correcting section corrects the speech recognition score of the words recognized by the speech recognizing section in accordance with the utterance timing decided by the utterance timing deciding section and the operation state of the in-vehicle equipment collected by the in-vehicle equipment operation state collecting section.

7. The speech recognizing apparatus according to claim 1, further comprising:
a driving operation detecting section for detecting a driving operation state, wherein
the speech recognition score correcting section corrects the speech recognition score of the words recognized by the speech recognizing section in accordance with the utterance timing decided by the utterance timing deciding section and the driving operation state detected by the driving operation detecting section.

8. A speech recognizing apparatus comprising:
a speech start instructing section for receiving a non-verbal instruction to start speech recognition;
a speech input section for receiving uttered speech and for converting it to a speech signal;
a speech recognizing section for recognizing the speech on the basis of the speech signal delivered from the speech input section;
an utterance start time detecting section for detecting a duration starting when the speech start instructing section instructs to start the speech recognition and concluding when a speech signal is first delivered by the speech input section after the instruction to start speech recognition is first received;
a variance considering utterance timing learning section for calculating an utterance timing decision threshold considering a variance on the basis of durations detected by the utterance start time detecting section in plural times of past trials;
an utterance timing deciding section for deciding the utterance timing indicating whether an utterance start is quick or slow by comparing the utterance timing decision threshold, which is calculated by the variance considering utterance timing learning section and is used as a prescribed threshold, with the duration detected by the utterance start time detecting section;
an interaction control section for determining a content, which is to be shown when exhibiting a recognition result of the speech recognizing section, in accordance with the utterance timing decided by the utterance timing deciding section;
a system response generating section for generating a system response on the basis of the content to be shown determined by the interaction control section;
an output section for outputting the system response generated by the system response generating section; and
a correction key for instructing to cancel the recognition result by the speech recognizing section, wherein
the variance considering utterance timing learning section calculates the utterance timing decision threshold considering the variance on the basis of the durations detected by the utterance start time detecting section in plural times of past trials and on the basis of duration from a time when the output section outputs the system response to a time when the correction key instructs canceling.

\* \* \* \* \*